United States Patent [19]

Spalluto

[11] E Re. 31,539

[45] Reissued Mar. 20, 1984

[54] REMOTE-CONTROL DEVICE FOR A CRANE

[75] Inventor: Frank P. Spalluto, Piscataway, N.J.

[73] Assignee: Garden State Engine & Equipment Co., Inc., South Plainfield, N.J.

[21] Appl. No.: 431,739

[22] Filed: Sep. 30, 1982

Related U.S. Patent Documents

Reissue of:

[64] Patent No.: 4,307,810
Issued: Dec. 29, 1981
Appl. No.: 106,374
Filed: Dec. 21, 1979

[51] Int. Cl.[3] ..... B66C 13/42
[52] U.S. Cl. ..... 212/160; 200/81 H
[58] Field of Search ..... 212/159, 160, 162–165; 200/81 H; 414/909

[56] References Cited

U.S. PATENT DOCUMENTS

| | | | |
|---|---|---|---|
| 2,254,083 | 8/1941 | Nickles | 212/160 |
| 2,523,170 | 9/1950 | Wickerham | 212/160 |
| 3,845,258 | 10/1974 | Bruels | 200/81 H |

*Primary Examiner*—Robert G. Sheridan
*Attorney, Agent, or Firm*—Weinstein & Sutton

[57] ABSTRACT

A remote-control assembly for controlling a crane or the like which completely insulates the operator of the remote-control assembly from electric shock. The remote-control assembly includes a remote-control box having a plurality of fluid valves, a converter box including a plurality of pressure switches, and a plurality of fluid lines connecting the fluid valves to the pressure switches. The pressure switches are electrically connected to an electric plug which is adapted to be connected to the electrical control box on the chassis of the crane for operating the crane.

8 Claims, 2 Drawing Figures

REMOTE-CONTROL DEVICE FOR A CRANE

Matter enclosed in heavy brackets [ ] appears in the original patent but forms no part of this reissue specification; matter printed in italics indicates the additions made by reissue.

FIELD OF THE INVENTION

The present invention relates to a remote-control unit for a crane, a shovel, or a similar machine, and more particularly, to an improved remote-control unit for insulating the operator from electrical shock.

BACKGROUND OF THE INVENTION

Remote-control units for cranes and the like are generally well known. Typically, present remote-control systems for cranes include about 30 feet of electric, multiconductor wire cable connected to a hand-held, remote-control box which contains a plurality of electrical switches. The other end of the cable is connected to a control circuit on the chassis of the crane for controlling the various operations of the boom, trolley, and hoist on the crane. In this manner, when the operator actuates an electrical switch on the remote-control box, it energizes one of the control circuits to operate a particular component of the crane, such as moving the boom, or moving the trolley, or moving the hoist.

Although such an arrangement is generally satisfactory from an operational standpoint, there are certain drawbacks. For example, the remote-control box and cable, as well as the crane, are all electrically conductive. Therefore, during operation of the crane, if the operator inadvertently causes the boom to hit a high-voltage electric line, it will discharge through the crane and electric cable directly to the operator holding the remote-control box. As a result, the operator receives a large electrical shock and may be injured or killed. As such high-voltage lines are a common occurrence at work sites which employ such cranes, it is not uncommon for the operator of the remote-control unit to be injured as a result of the boom inadvertently striking a high-voltage line.

One possible solution would be to insulate the entire remote-control unit which is being held by the operator. However, this would make the remote-control unit too bulky. Moreover, there is no practical way to sufficiently insulate each of the individual switches on the remote-control box.

Another attempted solution has been to employ a fiber-optic remote-control unit with converters for converting the light signals to electrical signals. However, such an arrangement has been found to be too delicate and unreliable and prone to frequent breakdowns.

Accordingly, it would be highly desirable to provide an arrangement for a remote-control unit for a crane or the like which completely eliminates the possibility of the operator of the remote-control unit receiving an electric shock when the boom strikes a high-voltage line, and to provide such an arrangement which is both economical and reliable.

Broadly, it is an object of the present invention to provide an improved remote-control unit for a crane which satisfies one or more of the foregoing objectives. Specifically, it is within the contemplation of the present invention to provide an improved remote-control unit for use in such devices as cranes, shovels, and the like which eliminates the possibility of the operator of the remote-control unit being subject to an electric shock.

It is a further object of the present invention to provide an improved remote-control unit which is completely insulated from the crane and the electrical control circuit mounted on the chassis of the crane.

It is a still further object to provide an improved remote-control unit which is economical, reliable, and able to withstand tough field conditions and inclement weather conditions.

SUMMARY OF THE INVENTION

Briefly, in accordance with the principles of the present invention, an improved remote-control assembly or unit is provided for controlling cranes, shovels, or similar machines. Typically, the crane includes a movable boom which is pivotally mounted on the chassis of the crane so that it can be swung in either direction. In addition, as is well known in the art, a trolley is mounted for movement along the boom, and a movable hoist is also provided. The electrical control circuit on the chassis of the crane, as is also known in the art, includes a plurality of electric circuits for controlling and moving the various elements of the crane, including the boom, trolley, and hoist. In the preferred embodiment, the remote-control unit includes a remote-control box, a hose, a converter box, and an electrical plug connected to the converter box. The remote-control box includes a plurality of air valves, for example, four two-way air valves. These air valves are connected by a plurality of plastic tubes running through a common plastic hose to a plurality of pressure switches mounted in the converter box. As will be explained herein, if there are four two-way air valves in the remote-control box, the common plastic hose would have nine plastic tubes extending through it, two for each air valve and one common air supply line. In addition, the converter box would include eight pressure switches. Each of the pressure switches is electrically conected to the electrical plug. As in the prior art devices, the electrical plug is adapted to be plugged into the electrical control circuit for controlling the crane which is mounted on the chassis of the crane.

Advantageously, as a result of the present invention, there is provided an arrangement which completely eliminates the possibility of the operator of the remote-control box receiving an electrical shock when the boom strikes a high-voltage line. As will be understood, when the boom strikes a high-voltage line, the electricity will discharge through the chassis of the crane and the electrical control circuits and the electric lines between the plug and the converter box. However, the electricity will not discharge through the pressure switches, or the plastic tubing, or the remote-control box connected to the plastic tubing. In this manner, the operator of the remote-control box is completely insulated from such an electric shock.

BRIEF DESCRIPTION OF THE DRAWINGS

Further objects, features, and advantages of the present invention will become apparent upon the consideration of the following detailed description of a presently preferred embodiment when taken in conjunction with the accompanying drawings, wherein.

DETAILED DISCUSSION OF PREFERRED EMBODIMENT OF THE INVENTION

Figure 1:
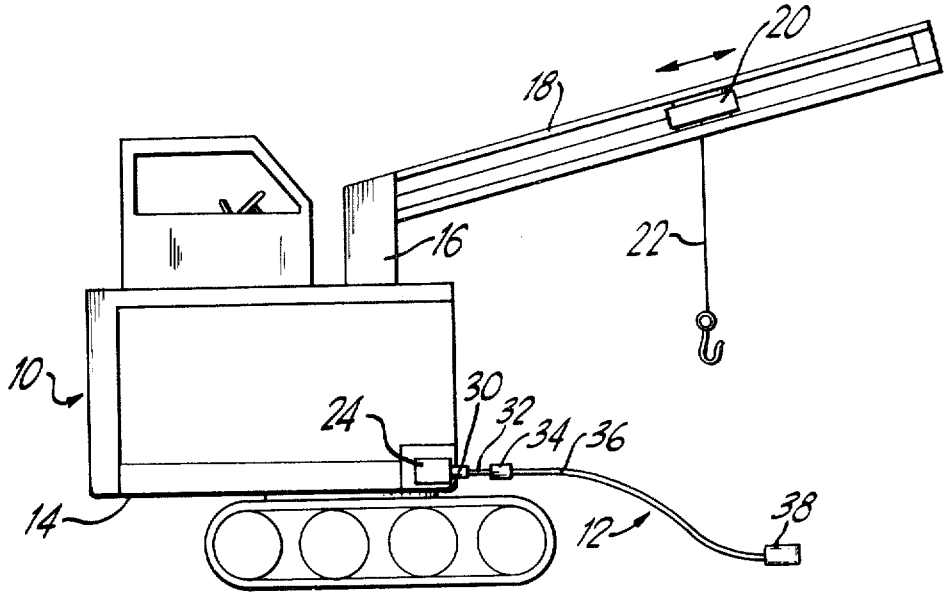
FIG. 1 is a side elevational view of a crane and a remote-control assembly connected thereto.

Referring now to FIG. 1, there is shown a crane 10 and a remote-control assembly 12 embodying the principles of the present invention. As is well known in the art, the crane 10 includes a chassis or frame 14 having a rotating pedestal 16 mounted thereon. A boom 18 is provided and pivots relative to the pedestal 16. In addition, a trolley 20 is movably mounted on the bottom 18 and is provided with a cable or hoist 22 which may be moved up and down relative to the boom. As is also known in the art, mounted on the chassis 14 of the crane, there is provided an electrical control box 24 which includes suitable circuitry for operating and controlling the boom 18, the trolley 20, and the hoist or cable 22. Typically, such electrical circuitry includes four two-way solenoid valves (not shown). One solenoid valve is for moving the boom 18 up and down, a second solenoid valve is for swinging the boom to the left or right, a third solenoid valve is for moving the trolley 20 relative to the boom 18, and the fourth solenoid valve is for moving the cable or hoist 22 up and down.

As will be seen in FIG. 1, the remote-control assembly 12 includes an electric plug 30, a line 32 connecting it to a converter box 34, and a plastic hose or line 36 connecting the converter box 34 to a remote-control box 38. As will be understood, the crane 10 and the electrical control circuit 24 for controlling the crane are conventional features well known in the art and need not be described in further detail. The present invention only concerns the remote-control assembly 12, and specifically the elements between remote-control box 38 and electric plug 30.

Figure 2:
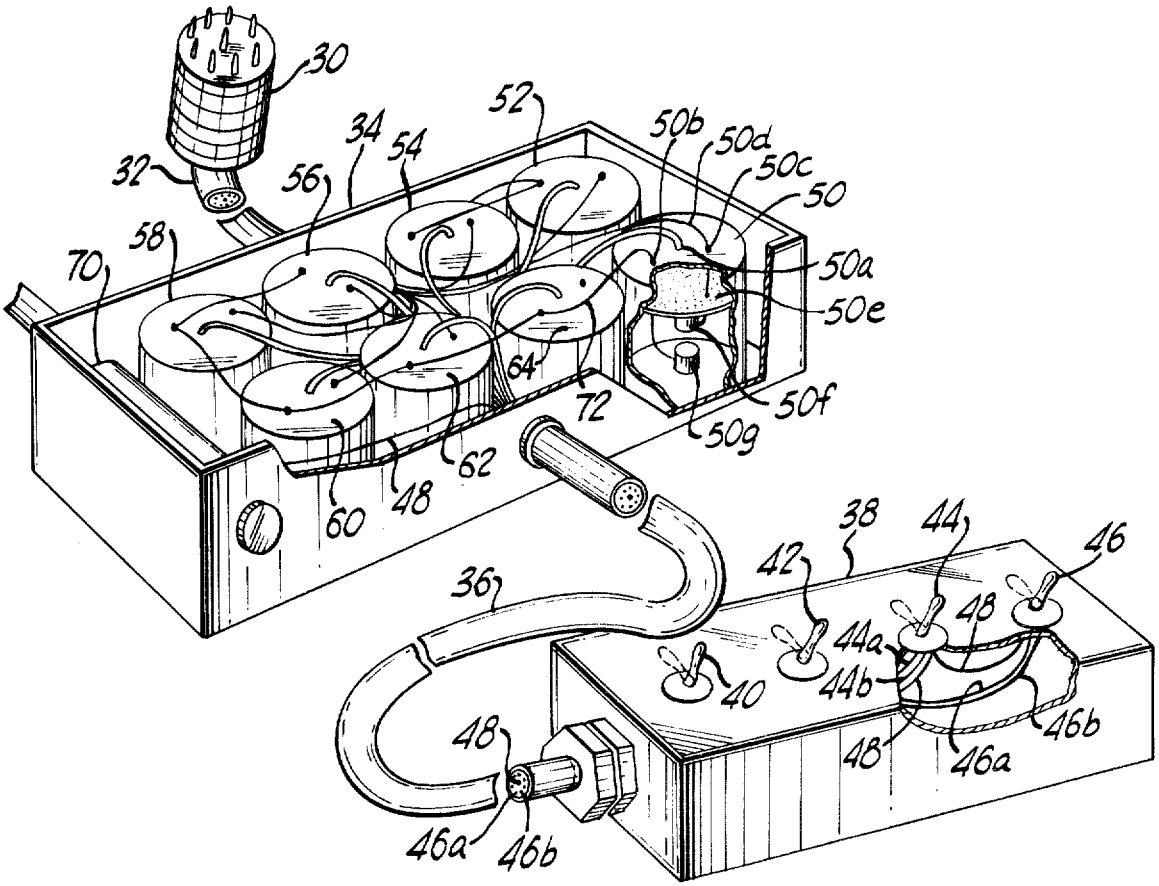
FIG. 2 is a detailed view of the remote-control assembly of the present invention.

Referring now to FIG. 2, a more detailed view of the remote-control assembly 12 is provided. As will be noted, remote-control box 38 includes four two-way air valves 40, 42, 44, and 46, preferably of the toggle type, as shown. Each of the valves is connected to two air lines, such as 46a, 46b, and a common air supply line 48. As will be understood, line 46a is for controlling one particular function, such as swinging of the boom 18 to the left, whereas the other line 46b would be for controlling the boom to swing in the other direction. Basically, the four air valves 40, 42, 44, and 46 replace the four electrical two-position switches employed on remote-control boxes in the past. The two air lines from each air valve and the one common air supply line 48 form a total of nine air lines. Such air lines can be formed of any non-conductive material, and preferably are formed of plastic. These nine plastic lines extend through common hose 36 which is also formed of a non-conductive material, such as plastic.

Referring now to converter box 34, it shows the air or fluid lines 46a, 46b, etc., extending into the converter box, with each line being connected to a different one of the eight pressure switches 50, 52, 54, 56, 58, 60, 62, and 64 mounted in converter box 34. For example, fluid line 46a is connected to pressure switch 50 at terminal 50a. In addition, common fluid line 48 extends into converter box 34 and is connected to a pressure regulator 70 which is connected to a source of compressed air (not shown). For example, the source of compressed air can be right on the crane 10 which is used to supply compressed air for other functions on the crane. Preferably, the source of compressed air should be at 120 psi, and the pressure regulator 70 should supply compressed air via line 48 to the air lines 46a, 46b, 44a, etc., at 30 psi in order to operate the pressure switches.

Each of the pressure switches 50 to 64 includes two additional terminals for electrical connections. For example, pressure switch 50 includes a terminal 50b which is adapted to be connected to a common electrical wire 72. As will be seen, wire 72 is adapted to be connected to one terminal of each of the pressure switches, and then wire 72 extends into the electric plug 30. Similarly, each pressure switch includes a third terminal, such as terminal 50c, so that each pressure switch is electrically connected to plug 30 by another electric line, such as line 50d. As explained above, electric plug 30 is adapted to be plugged into control box 24 mounted on the chassis 14 of the crane 10.

Referring now to FIG. 2, operation of the remote-control assembly 12 of the present invention will now be provided. When a particular function of the crane is required, such as pivoting the boom 18 to the left or right, one of the air valves, such as air valve 46, is moved to one of its two positions. As a result, compressed air is supplied by common fluid line 48 to one of the fluid lines connected to the air valve, such as fluid line 46a. Then, compressed air flows through fluid line 46a and operates to actuate one of the pressure switches, such as pressure switch 50. As a result, the particular pressure switch which is operated, then operates to complete an electrical circuit between the pressure switch and the electric plug 30. Then, the particular electrical control circuit in control box 24 for moving the boom is operated in a conventional manner. More particularly, one of the solenoid valves is actuated to cause the boom to move, as is known in the art.

Although the present invention has been described using compressed air and air valves, it should be understood that other fluids may be employed, such as oil. In such an arrangement, fluid valves would be connected to fluid lines, instead of air valves connected to air lines. In addition, any type of conventional pressure switch may be employed, as long as it has the capacity of being operated by a fluid to close a pair of electrical contacts to complete a circuit. For example, the pressure switch may include a diaphragm 50e which is moved by the incoming fluid to close electrical contacts 50f and 50g.

In view of the foregoing, it will be appreciated that there has been provided in accordance with the present invention a simple, economical, and reliable device for completely insulating the operator of the remote-control box 38 from electric shock. That is, there is 30 feet of plastic cable 36 extending between the electrical lines in converter box 34 and the remote-control box 38 which is being held by the operator. In this manner, the operator of the remote-control box is completely insulated from any electric shock which may be discharged from the crane 10 into the electrical control circuit 24, the electric plug 30, and the converter box 34. In fact, the plastic tubing 36 has been tested to withstand a 70,000 volt charge.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claims is:

1. A remote-control assembly for controlling a crane or the like having a movable member, wherein said crane includes an electrical control circuit for controlling said movable member, comprising:

a remote-control box including a plurality of fluid valves and means for operating said fluid valves;

a converter box including a plurality of pressure switches;

each of said pressure switches including a diaphragm having at least one electrical contact mounted thereon;

each of said pressure switches being formed by a separate housing for enclosing said diaphragm and said electrical contact;

a plurality of fluid lines connecting said fluid valves to operate the diaphragms in each of said pressure switches; and a plurality of electric lines connecting the electrical contacts of said pressure switches to said electrical control circuit on said crane for operating said movable member.

2. A remote-control assembly in accordance with claim 1, wherein said remote-control box includes a plurality of two-way air valves.

3. A remote-control assembly in accordance with claim 1, wherein said converter box includes a pressure regulator for supplying compressed air to said pressure switches.

4. A remote-control assembly in accordance with claim 1, wherein said plurality of fluid lines is formed of plastic tubes for supplying air.

5. A remote-control assembly in accordance with claim 4, wherein said plurality of plastic tubes is housed in a common plastic hose.

6. A remote-control assembly in accordance with claim 1, further including an electric plug connected to said plurality of electric lines adapted to be plugged into said electrical control circuit.

*7. A remote-control assembly for controlling a crane or the like having a movable member, wherein said crane includes an electrical control circuit for controlling said movable member, comprising:*

*a remote-control box including a plurality of fluid valves and means for operating said fluid valves;*

*a converter box including a plurality of pressure switches;*

*each of said pressure switches including movable means having an electrical contact;*

*each of said pressure switches being formed by a separate housing for enclosing said movable means and said electrical contact;*

*a plurality of fluid lines connecting said fluid valves to operate the movable means in each of said pressure switches; and*

*a plurality of electric lines connecting the electrical contacts of said pressure switches to said electrical control circuit on said crane for operating said movable member.*

*8. A remote-control assembly for controlling a crane or the like having a movable member, wherein said crane includes an electrical control circuit for controlling said movable member, comprising:*

*a remote-control box including a plurality of fluid valves and means for operating said fluid valves;*

*a converter box including a plurality of pressure switches;*

*each of said pressure switches including an electrical contact switch having movable means activated by air pressure;*

*each of said pressure switches being formed by a separate housing for enclosing said electrical contact switch;*

*a plurality of fluid lines connecting said fluid valves to operate the movable means in each of said pressure switches; and*

*a plurality of electric lines connecting the electrical contacts of said pressure switches to said electrical control circuit on said crane for operating said movable member.*

* * * * *